(12) United States Patent
Belotserkovsky et al.

(10) Patent No.: US 7,760,616 B2
(45) Date of Patent: Jul. 20, 2010

(54) EXTRACTING THE PHASE OF AN OFDM SIGNAL SAMPLE

(75) Inventors: Maxim Borisovich Belotserkovsky, Indianapolis, IN (US); Vincent Demoulin, Pleumeleuc (FR); Louis Robert Litwin, Plainsboro, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 1492 days.

(21) Appl. No.: 10/523,450

(22) PCT Filed: Jul. 31, 2002

(86) PCT No.: PCT/US02/24263

§ 371 (c)(1),
(2), (4) Date: Jan. 31, 2005

(87) PCT Pub. No.: WO2004/014005

PCT Pub. Date: Feb. 12, 2004

(65) Prior Publication Data

US 2005/0226139 A1    Oct. 13, 2005

(51) Int. Cl.
    *H04J 11/00*    (2006.01)
(52) U.S. Cl. .................. 370/208; 370/210; 375/323; 375/375
(58) Field of Classification Search ......... 370/206–210, 370/281, 295, 330, 343, 436, 478, 480; 375/229, 375/215, 226, 269, 273, 280, 260, 294, 327, 375/323, 329, 331, 332, 373, 375, 376
See application file for complete search history.

(56) References Cited

U.S. PATENT DOCUMENTS

| 5,255,290 | A |   | 10/1993 | Anvari |
| 5,287,067 | A |   | 2/1994  | Denno et al. |
| 5,581,582 | A |   | 12/1996 | Choi |
| 5,959,965 | A | * | 9/1999  | Ohkubo et al. ............ 370/203 |
| 6,055,231 | A |   | 4/2000  | Mesecher et al. |
| 6,438,183 | B1| * | 8/2002  | Taura et al. .................. 375/343 |
| 6,853,616 | B1| * | 2/2005  | Kim et al. .................... 370/210 |
| 7,403,471 | B2| * | 7/2008  | Sudo et al. ................... 370/208 |
| 2009/0122883 | A1 | * | 5/2009 | Geile ........................ 375/260 |

FOREIGN PATENT DOCUMENTS

| JP | 63204837 | 8/1988 |
| JP | 647714 | 1/1989 |
| JP | 2000188580 | 7/2000 |

OTHER PUBLICATIONS

Search Report Dated Sep. 24, 2002.

* cited by examiner

*Primary Examiner*—Ian N Moore
(74) *Attorney, Agent, or Firm*—Robert D. Shedd; Vincent E. Duffy; Michael A. Pugel

(57) ABSTRACT

The disclosed embodiments relate to exploiting circuitry that exists in a typical Orthogonal Frequency Division Multiplexing (OFDM) receiver to find the phase of a complex number corresponding to an input signal without implementing additional costly circuitry or employing a relatively slow inverse tangent look-up table. The magnitude of the complex number is normalized and processed through a closed loop to produce an output proportional to the phase of the complex number.

10 Claims, 5 Drawing Sheets

EXTRACTING THE PHASE OF AN OFDM SIGNAL SAMPLE

This application claims the benefit, under 35 U.S.C. §365 of International Application PCT/US02/24263, filed Jul. 31, 2002, which was published in accordance with PCT Article 21(2) on Feb. 12, 2004 in English.

FIELD OF THE INVENTION

The present invention relates to processing orthogonal frequency division multiplexed (OFDM) signals.

BACKGROUND OF THE INVENTION

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

A wireless LAN (WLAN) is a flexible data communications system implemented as an alternative or extension to a wired LAN within a building or campus. Using electromagnetic waves, WLANs transmit and receive data over the air, minimizing the need for wired connections. Thus, WLANs combine data connectivity with user mobility, and, through simplified configuration, enable movable LANs. Some industries that have benefited from the productivity gains of using portable terminals (e.g., notebook computers) to transmit and receive real-time information are the digital home networking, health are, retail, manufacturing, and warehousing industries.

Manufacturers of WLANs have a range of transmission technologies to choose from when designing a WLAN. Some exemplary technologies are multicarrier systems, spread spectrum systems, narrowband systems, and infrared systems. Although each system has its own benefits and detriments, one particular type of multicarrier transmission system, orthogonal frequency division multiplexing (OFDM), has proven to be exceptionally useful for WLAN communications.

OFDM is a robust technique for efficiently transmitting data over a channel. The technique uses a plurality of subcarrier frequencies (sub-carriers) within a channel bandwidth to transmit data. These sub-carriers are arranged for optimal bandwidth efficiency compared to conventional frequency division multiplexing (FDM) which can waste portions of the channel bandwidth in order to separate and isolate the subcarrier frequency spectra and thereby avoid inter-carrier interference (ICI). By contrast, although the frequency spectra of OFDM sub-carriers overlap significantly within the OFDM channel bandwidth, OFDM nonetheless allows resolution and recovery of the information that has been modulated onto each sub-carrier.

The transmission of data through a channel via OFDM signals also provides several other advantages over more conventional transmission techniques. Some of these advantages are a tolerance to multipath delay spread and frequency selective fading, efficient spectrum usage, simplified sub-channel equalization, and good interference properties.

In processing OFDM signals, it is frequently desirable to determine the phase of a given complex number corresponding to an input signal. One example of such a complex number is a frequency domain subcarrier value. The ability to determine the phase of complex numbers representing an input signal is useful for many purposes, such as synchronizing the received data signal to ensure the maximum amount of integrity in the received data compared to the transmitted data. Traditionally, determining the phase of a complex number would require first finding the tangent of the phase of the complex number:

tangent=imaginary/real

After determination of the tangent of the complex number, an inverse tangent look-up table could be used to determine the phase angle of the complex number corresponding to the input signal. Depending on the accuracy required, such an inverse tangent look-up table could be very large and expensive to implement in hardware. A method and apparatus capable of determining the phase of a complex number corresponding to an input signal without accessing an inverse tangent look-up table is desirable.

SUMMARY OF THE INVENTION

The disclosed embodiments relate to exploiting circuitry that exists in a typical Orthogonal Frequency Division Multiplexing (OFDM) receiver to find the phase of a complex number corresponding to an input signal without implementing additional costly circuitry or employing a relatively slow inverse tangent look-up table. The magnitude of a complex number corresponding to an input signal is normalized, which has the effect of extracting the exponent of the complex portion of the sample. The exponent may be passed through a closed loop that includes a numerically controlled oscillator (NCO). The input value to the closed loop may stay constant for a predetermined number of clock cycles sufficiently long to allow the loop to converge for any phase of input sample. After convergence, the output of the NCO will be a signal that is proportional to the phase of the complex number corresponding to the input signal. Additional mathematical processing may be needed to convert the NCO output to the desired phase value.

DETAILED DESCRIPTION OF THE PREFERRED EMBODIMENT

The characteristics and advantages of the present invention will become more apparent from the following description, given by way of example.

Figure 1:
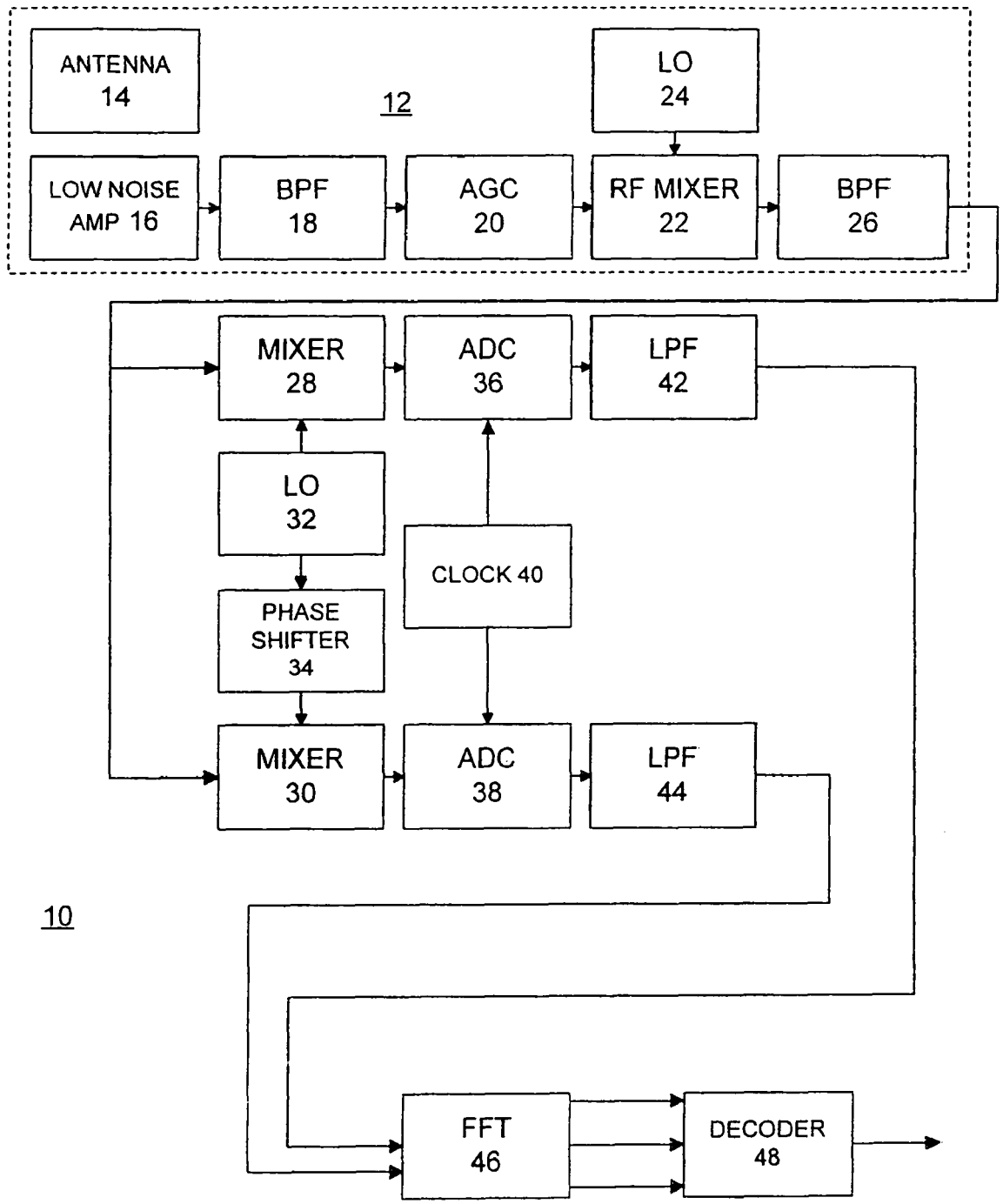
FIG. 1 is a block diagram of an exemplary OFDM receiver.

Referring to FIG. 1, the first element of a typical OFDM receiver 10 is an RF receiver 12. Many variations of the RF receiver 12 exist and are well known in the art, but typically, the RF receiver 12 includes an antenna 14, a low noise amplifier (LNA) 16, an RF band pass filter 18, an automatic gain control (AGC) circuit 20, an RF mixer 22, an RF carrier frequency local oscillator 24, and an IF band pass filter 26.

Through the antenna 14, the RF receiver 12 couples in the RF OFDM-modulated carrier after it passes through the channel. Then, by mixing it with a receiver carrier of frequency $f_{cr}$ generated by the RF local oscillator 24, the RF receiver 12 downconverts the RF OFDM-modulated carrier to obtain a received IF OFDM signal. The frequency difference between the receiver carrier and the transmitter carrier contributes to the carrier frequency offset, delta $f_c$.

This received IF OFDM signal is coupled to a mixer 28 and a mixer 30 to be mixed with an in-phase IF signal and a 90° phase-shifted (quadrature) IF signal, respectively, to produce in-phase and quadrature OFDM signals, respectively. The in-phase IF signal that feeds into the mixer 28 is produced by an IF local oscillator 32. The 90° phase-shifted IF signal that feeds into mixer 30 is derived from the in-phase IF signal of the IF local oscillator 32 by passing the in-phase IF signal through a 90° phase shifter 34 before providing it to the mixer 30.

The in-phase and quadrature OFDM signals then pass into analog-to-digital converters (ADCs) 36 and 38, respectively, where they are digitized at a sampling rate $f_{ck\_r}$ as determined by a clock circuit 40. The ADCs 36 and 38 produce digital samples that form an in-phase and a quadrature discrete-time OFDM signal, respectively. The difference between the sampling rates of the receiver and that of the transmitter is the sampling rate offset, delta $f_{ck}=f_{ck\_r}-f_{ck\_t}$.

The unfiltered in-phase and quadrature discrete-time OFDM signals from the ADCs 36 and 38 then pass through digital low-pass filters 42 and 44, respectively. The output of the low pass digital filters 42 and 44 are filtered in-phase and quadrature samples, respectively, of the received OFDM signal. In this way, the received OFDM signal is converted into in-phase (qi) and quadrature (pi) samples that represent the real and imaginary-valued components, respectively, of the complex-valued OFDM signal, $r_i=q_i+jp_i$. These in-phase and quadrature (real-valued and imaginary-valued) samples of the received OFDM signal are then delivered to an FFT 46. Note that in some conventional implementations of the receiver 10, the analog-to-digital conversion is done before the IF mixing process. In such an implementation, the mixing process involves the use of digital mixers and a digital frequency synthesizer. Also note that in many conventional implementations of receiver 10, the digital-to-analog conversion is performed after the filtering.

The FFT 46 performs the Fast Fourier Transform (FFT) of the received OFDM signal in order to recover the sequences of frequency-domain sub-symbols that were used to modulate the sub-carriers during each OFDM symbol interval. The FFT 46 then delivers these sequences of sub-symbols to a decoder 48.

The decoder 48 recovers the transmitted data bits from the sequences of frequency-domain sub-symbols that are delivered to it from the FFT 46. This recovery is performed by decoding the frequency-domain sub-symbols to obtain a stream of data bits which should ideally match the stream of data bits that were fed into the OFDM transmitter. This decoding process can include soft Viterbi decoding and/or Reed-Solomon decoding, for example, to recover the data from the block and/or convolutionally encoded sub-symbols.

Figure 2:
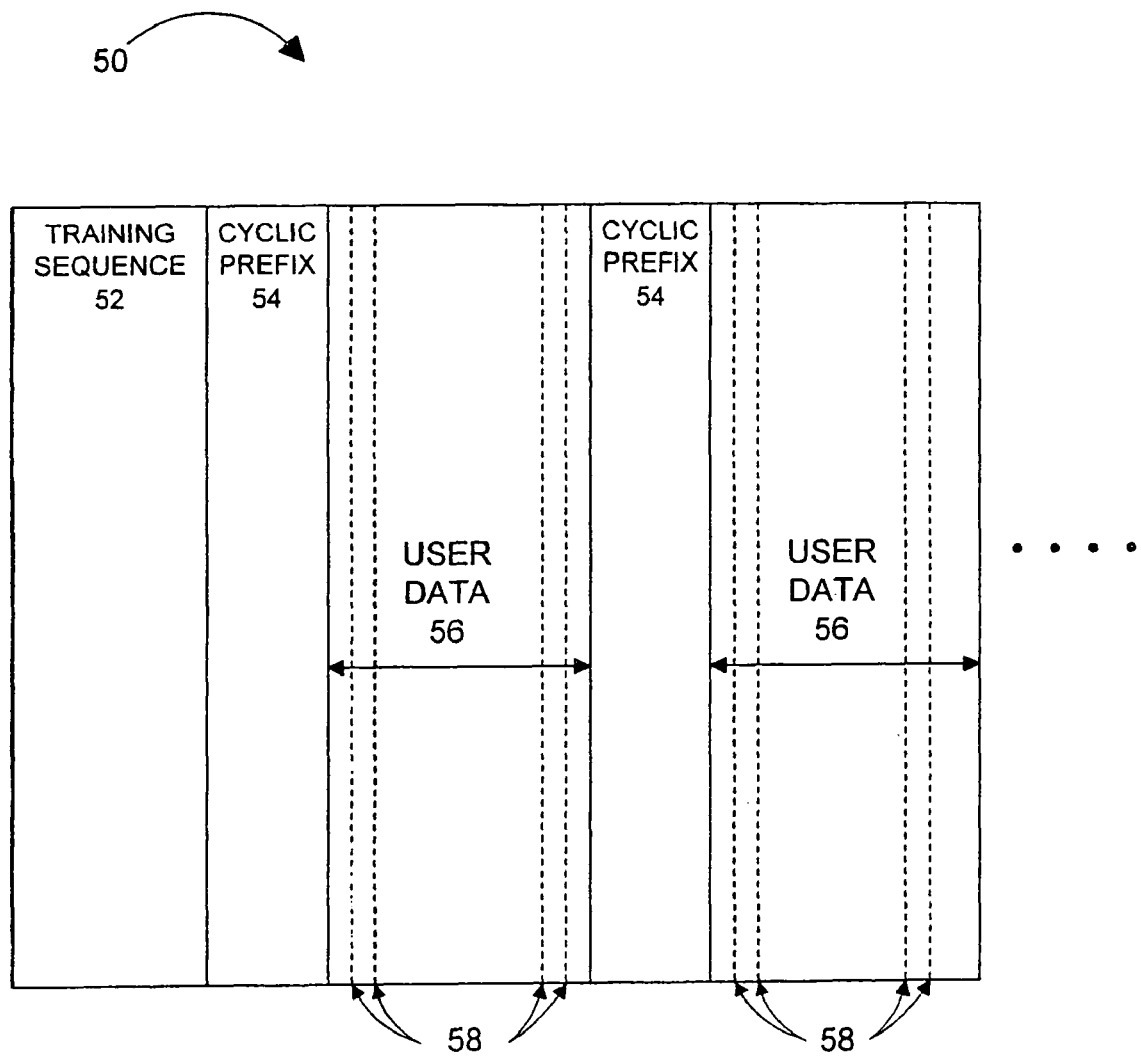
FIG. 2 is a diagram illustrating the placement of a training sequence, user data, and pilot signals within an OFDM symbol frame.

Turning to FIG. 2, an exemplary OFDM symbol frame 50 of the present invention is shown. The symbol frame 50 includes a training sequence or symbol 52 containing known transmission values for each subcarrier in the OFDM symbol, and a predetermined number of a cyclic prefix 54 and user data 56 pairs. For example, the proposed ETSI-BRAN HIPERLAN/2 (Europe) and IEEE 802.11a (USA) wireless LAN standards, herein incorporated by reference, assign 64 known values or subsymbols (i.e., 52 non-zero values and 12 zero values) to selected training symbols of a training sequence (e.g., "training symbol C" of the proposed ETSI standard and "long OFDM training symbol" of the proposed IEEE standard). The user data 56 has a predetermined number of pilots 58, also containing known transmission values, embedded on predetermined subcarriers. For example, the proposed ETSI and IEEE standards have four pilots located at bins or subcarriers ±7 and ±21. Although the present invention is described as operating in a receiver that conforms to the proposed ETSI-BRAN HIPERLAN/2 (Europe) and IEEE 802.11a (USA) wireless LAN standards, it is considered within the skill of one skilled in the art to implement the teachings of the present invention in other OFDM systems.

Figure 3:
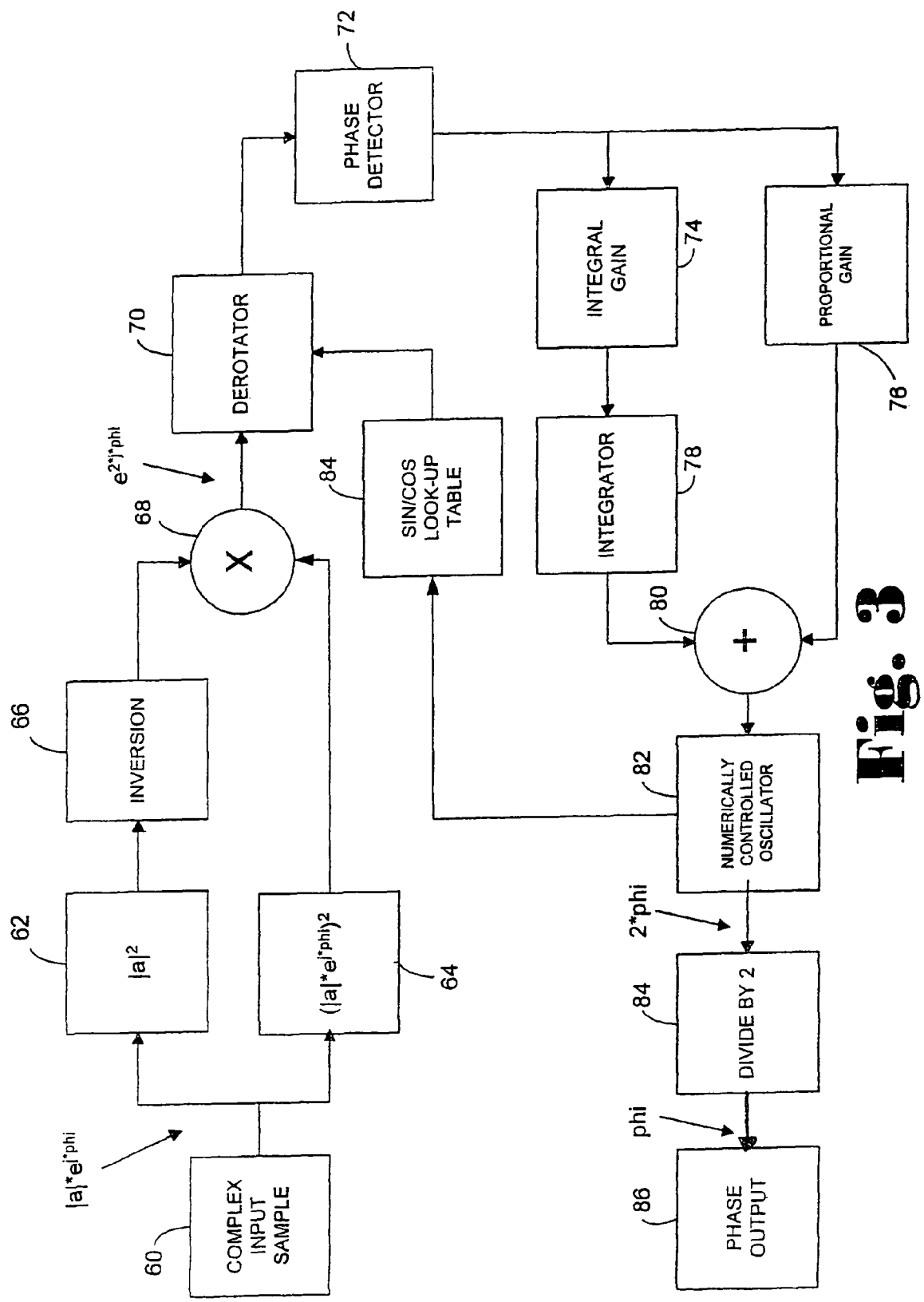
FIG. 3 is a block diagram of a circuit for extracting the phase of a complex number corresponding to an input signal.

FIG. 3 is a block diagram of a circuit for extracting the phase of a complex number corresponding to an input signal. In processing OFDM signals, it is frequently desirable to determine the phase of complex numbers, such as the output from the BPF 26 (FIG. 1). The complex numbers of which the phase is desired to be known is identified by reference numeral 60 in FIG. 3. The complex number may be generally represented as follows:

$$|a|e^{j*phi}$$

In this representation, |a| is the magnitude of the complex number and phi is the phase angle of the complex number in radians.

To extract this phase angle, the complex number representation must be manipulated mathematically to determine the angle phi. The first step in this mathematical manipulation is to extract the exponent from the complex representation of the sample. Extraction of the exponent may be accomplished by normalizing the magnitude of the sample to one. Normalizing the magnitude of the complex number ensures a constant gain closed-loop operation, which in turn assures loop convergence over a fixed number of clock cycles. The step of normalizing the magnitude of the complex number allows sampling of the loop output after a predetermined number of clocks (i.e. after the loop is known to have converged), thus eliminating the need to implement a relatively expensive and potentially unreliable loop-lock indicator.

To normalize the complex number, the magnitude of the complex number |a| is squared by a squaring circuit 62, which typically exists in most OFDM receivers (i.e. it does not have to be specially included). A squaring circuit 64 squares the entire value of the complex number (both the real and imaginary components). If no additional squaring circuit is present in the OFDM receiver in which the invention is implemented, the squaring circuit 62 may be used to square the complex number as well as to determine the square of the magnitude of the complex number. An inversion circuit 66 (also typically present in most OFDM receivers) is used to invert the output of the squaring circuit 62. The output of the squaring circuit 64 and the inversion circuit 66 are combined by multiplier 68. The output of the multiplier 68 equates to the normalized value of the square of the complex number, which may be expressed as $e^{2j*phi}$.

Now that the magnitude of the complex number has been normalized, the second step in determining the phase angle of the complex number comprises sending the output of the multiplier 68 through a closed loop. The second order carrier tracking loop, which is typically implemented in an OFDM receiver (i.e. does not have to be specifically added), is useful for this purpose.

Those of ordinary skill in the art will appreciate that the output of the multiplier 68 must be provided to the tracking loop (beginning with a derotator 70) for a predetermined number of clock cycles to ensure stabilization of the loop. The exact number of clock cycles needed to ensure loop stabilization in a given OFDM receiver configuration may be readily determined by those of ordinary skill in the art. Moreover, the determination of the number of clock cycles required for loop stabilization is not a crucial aspect of the present invention.

To continue with the description of the processing of the complex number by a closed loop such as the carrier tracking loop of a typical OFDM receiver, the output from the multiplier 68 is fed into the derotator 70 and the output of the derotator 70 is passed on to a phase detector 72. The output of the phase detector 72 is passed on to an integral gain amplifier 74 and a proportional gain amplifier 76. The output of the integral gain amplifier 74 is fed into an integrator 78. The output of the integrator 78 is combined with the output of the proportional gain amplifier 76 by a summing circuit 80. The output of the summing circuit 80 is fed into a numerically controlled oscillator (NCO) 82, which feeds into a sine/cosine look-up table 84. The output of the sine/cosine look-up table 84 is provided as feedback to the derotator 70.

In the illustrated embodiment, the output of the NCO 82 is equal to twice the phase of the complex number corresponding to the input signal. Division of the output of the NCO 82 by two with a divider circuit 84 results in a signal 86 that is equivalent to the phase angle phi of the complex number. Thus, the present invention determines the phase angle of a complex number corresponding to an input signal without the need of a cumbersome and costly inverse tangent look-up table.

Figure 4:
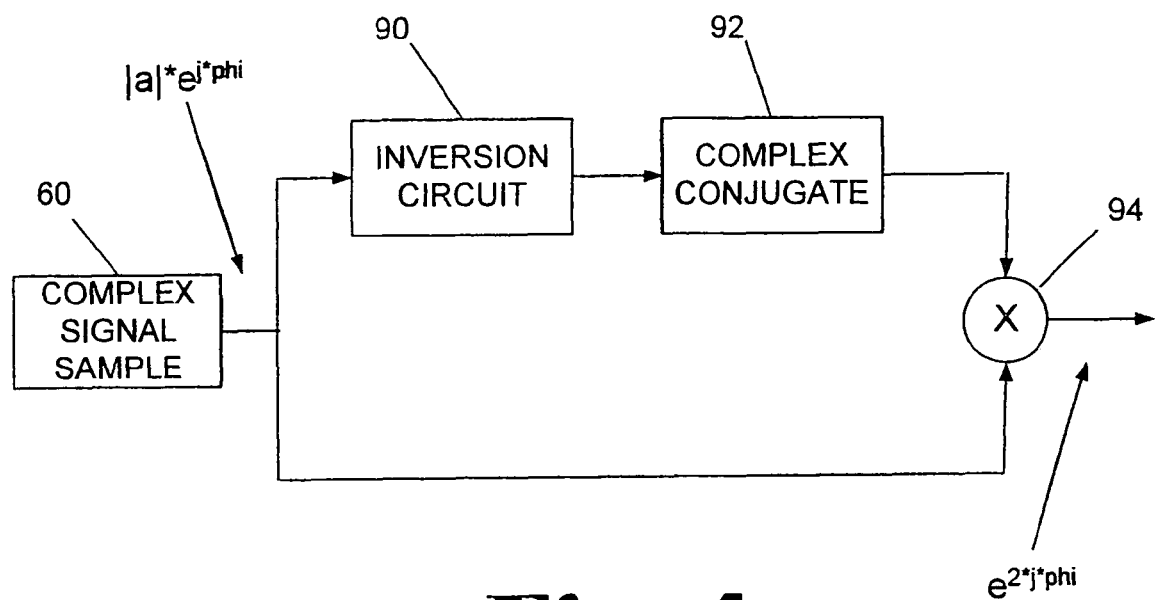
FIG. 4 is an alternative embodiment of a circuit for normalizing a complex number corresponding to an input signal.

FIG. 4 is an alternative embodiment of a circuit for normalizing a complex number. In the embodiment shown in FIG. 4, the complex number 60 is inverted by an inversion circuit 90. The complex conjugate of the inverse of the sample is determined by a complex conjugation circuit 92. A multiplier 94 multiplies the output of the complex conjugation circuit 92 by the complex number 60 (both the real and imaginary parts). The output of the multiplier 94, which is the normalized value of the complex number 60, may be fed into the closed loop circuit shown in FIG. 3 beginning with the rotator 70. Processing of the signal may then continue as described with reference to FIG. 3.

Figure 5:
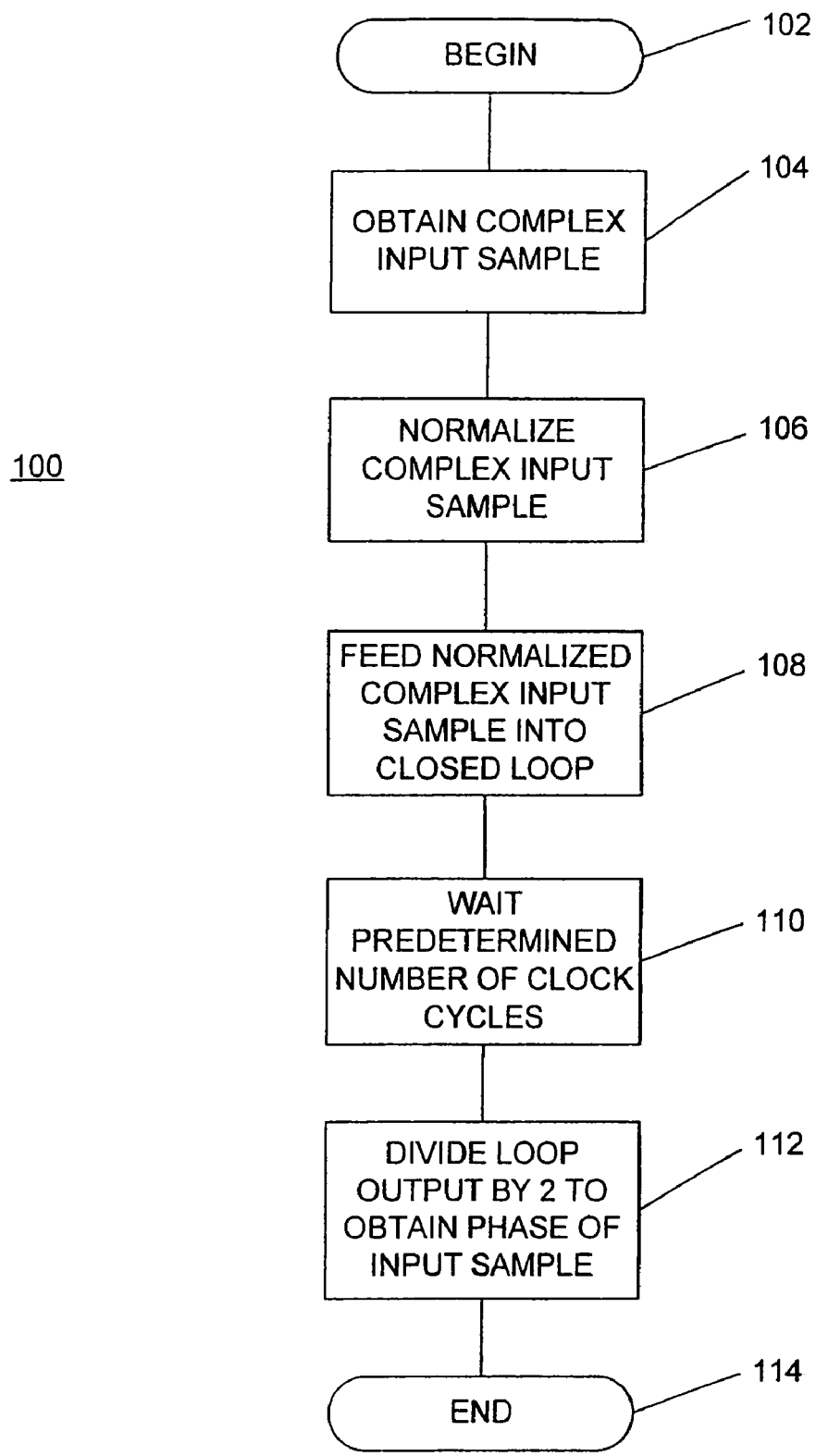
FIG. 5 is a process flow diagram illustrating the operation of an exemplary embodiment of the present invention.

FIG. 5 is a process flow diagram illustrating the operation of an exemplary embodiment of the present invention. The overall process is referred to by the reference numeral 100. The process begins at 102. At 104, a complex number corresponding to an input signal is obtained. This complex number may be representative of a portion of an OFDM signal that has been received by an OFDM receiver. At 106, the complex number is normalized. Normalization may be performed using any known method, including hardware methods, software methods and combined hardware and software methods. Examples of circuits that may be used for normalization of a complex number are shown and described with reference to FIG. 3 (the circuitry that feeds into the derotator 70) and FIG. 4. As described above, normalization of a complex number corresponding to an input signal ensures that loop convergence can be guaranteed within a predetermined number of receiver clock cycles.

Next, the normalized complex number is fed into closed loop at 108. An example of such a loop is the carrier tracking loop typically present in OFDM receivers. At 110, the input to the closed loop is maintained for a predetermined number of clock cycles. As described above, the purpose of waiting for a predetermined number of clock cycles is to allow loop convergence around a value that is proportional to the phase of the complex number. At 112, the loop output is divided by 2 to yield the phase of the complex. The method of the present invention eliminates the need to implement a costly and time consuming inverse tangent look-up table to determine the phase of a complex number corresponding to an input signal. At 114, the process of FIG. 5 ends.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

The invention claimed is:

1. A device that determines the phase of a complex number, the device comprising:
    circuitry that normalizes the complex number to produce a normalized complex number, the circuitry that normalizes the complex number including first circuitry that squares a magnitude of the complex number to produce a squared complex number magnitude, second circuitry that inverts the squared complex number magnitude to produce an inverted squared complex number magnitude, third circuitry that squares the complex number to obtain a squared complex number, and fourth circuitry that multiplies the inverted squared complex number magnitude by the squared complex number; and
    a closed loop circuit that receives the normalized complex number and produces an output that is proportional to the phase of the complex number.

2. The device of claim 1, wherein the device is contained in an Orthogonal Frequency Division Multiplexing (OFDM) receiver.

3. The device of claim 1, wherein the output that is proportional to the phase of the complex number is twice the phase of the complex number.

4. The device of claim 1, wherein the normalized complex number is presented to the closed loop circuit for a predetermined period of time.

5. The device of claim 4 wherein the predetermined period of time corresponds to a predetermined number of clock cycles.

6. The device of claim 1 wherein the circuitry that normalizes the complex number comprises:
    circuitry that inverts the complex number to obtain an inverted complex number;
    circuitry that determines a complex conjugate of the inverted complex number; and
    circuitry that multiplies the complex conjugate of the inverted complex number by the complex number.

7. An Orthogonal Frequency Division Multiplexing (OFDM) receiver, comprising:
    circuitry that receives a transmitted OFDM signal and converts at least a portion of the transmitted OFDM signal into a complex number;
    circuitry that normalizes the complex number to produce a normalized complex number, the circuitry that normalizes the complex number including first circuitry that squares a magnitude of the complex number to produce a squared complex number magnitude, second circuitry that inverts the squared complex number magnitude to produce an inverted squared complex number magnitude, third circuitry that squares the complex number to obtain a squared complex number, and fourth circuitry that multiplies the inverted squared complex number magnitude by the squared complex number; and a closed loop circuit that receives the normalized complex number and produces an output that is proportional to the phase of the complex number.

8. The OFDM receiver of claim 7, wherein the output that is proportional to the phase of the complex number is twice the phase of the complex number.

9. The OFDM receiver of claim 7, wherein the normalized complex number is presented to the closed loop circuit for a predetermined number of clock cycles.

10. The OFDM receiver of claim 7 wherein the circuitry that normalizes the complex number comprises:

circuitry that inverts the complex number to obtain an inverted complex number;

circuitry that determines a complex conjugate of the inverted complex number; and circuitry that multiplies the complex conjugate of the inverted complex number by the complex number.

* * * * *